(12) United States Patent
Thom et al.

(10) Patent No.: US 6,711,930 B2
(45) Date of Patent: Mar. 30, 2004

(54) FIBER OPTIC CABLE TROUGH COMPONENT NOTCHING SYSTEM

(75) Inventors: Terry T. Thom, Spokane, WA (US); Steven W. Ellison, Mead, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 09/873,011

(22) Filed: Jun. 1, 2001

(65) Prior Publication Data

US 2002/0178778 A1 Dec. 5, 2002

(51) Int. Cl.$^7$ ............................................. B21D 17/02
(52) U.S. Cl. .................... 72/409.01; 72/414; 72/409.1; 30/184; 30/363; 81/361
(58) Field of Search .................... 72/409.19, 409.01, 72/409.16, 409.18, 414, 412, 325, 324; 81/361, 362, 383.5, 355; 30/184, 211, 366, 363

(56) References Cited

U.S. PATENT DOCUMENTS

| | | | | |
|---|---|---|---|---|
| 1,728 A | * | 8/1840 | Leypoldt ...................... 460/86 |
| 14,065 A | * | 1/1856 | Fenstermacher ............ 100/102 |
| 727,890 A | * | 5/1903 | Brooks ......................... 30/184 |
| 750,024 A | * | 1/1904 | Etnyre ......................... 30/363 |
| 824,551 A | * | 6/1906 | Levis ....................... 72/409.01 |
| 1,065,752 A | * | 6/1913 | Whitney ...................... 30/363 |
| 1,552,722 A | * | 9/1925 | Melton ..................... 72/409.01 |
| 2,343,953 A | * | 3/1944 | Canter .......................... 30/184 |
| 2,687,661 A | * | 8/1954 | Richardson .................. 81/352 |
| 3,051,279 A | * | 8/1962 | Hougen .................... 72/409.01 |
| 3,395,724 A | * | 8/1968 | Hamel ..................... 72/409.01 |
| 3,525,107 A | | 8/1970 | Hays ............................... 7/5.3 |
| 3,606,806 A | | 9/1971 | Patrick ......................... 81/368 |
| 3,886,782 A | | 6/1975 | Miyamoto .................... 72/391 |
| 3,903,725 A | | 9/1975 | Rommel ....................... 72/410 |
| 4,334,703 A | * | 6/1982 | Arthur et al. .......... 29/890.043 |
| 4,531,397 A | * | 7/1985 | Pratt .......................... 29/243.5 |
| 4,729,170 A | * | 3/1988 | Hartmeister ............. 72/409.01 |
| 4,782,687 A | * | 11/1988 | Papesh ..................... 72/409.01 |
| 5,022,253 A | * | 6/1991 | Parlatore ................. 72/409.01 |
| 5,178,293 A | * | 1/1993 | Suzuki et al. ................ 206/484 |
| 5,386,856 A | | 2/1995 | Moody et al. ........... 140/123.5 |
| 5,435,029 A | | 7/1995 | Carlson, Jr. et al. ............ 7/107 |
| 5,560,110 A | * | 10/1996 | Haines ......................... 30/363 |
| D383,047 S | | 9/1997 | Scherer et al. ............... D8/107 |
| 5,732,461 A | | 3/1998 | Keffeler et al. ............... 29/751 |
| 5,771,945 A | | 6/1998 | Jenner et al. ............... 140/123 |
| 5,924,322 A | | 7/1999 | Caveney .................. 72/409.14 |
| 6,227,080 B1 | | 5/2001 | Grayo et al. .................. 81/368 |
| 6,269,674 B1 | * | 8/2001 | Sperko ..................... 72/409.19 |

FOREIGN PATENT DOCUMENTS

FR 720251 * 2/1932 ............. 72/409.01

OTHER PUBLICATIONS

Fibre Optic Management Systems Component Selection Guide (32 pages).
LightWays Ducting System/Siemon Cabling System (5 pages).

* cited by examiner

Primary Examiner—Daniel C. Crane
(74) Attorney, Agent, or Firm—Wells St. John P.S.

(57) ABSTRACT

A fiber optic cable trough notching system with a punch and a punch aperture spaced apart by a wall receiving opening for receiving a fiber optic cable trough component wall, the punch disposed to impart a force on the trough component wall to deform it into the punch aperture, and thereby create a detent and/or projection. The detent and/or projection are then utilized to operatively attach two trough components.

3 Claims, 11 Drawing Sheets

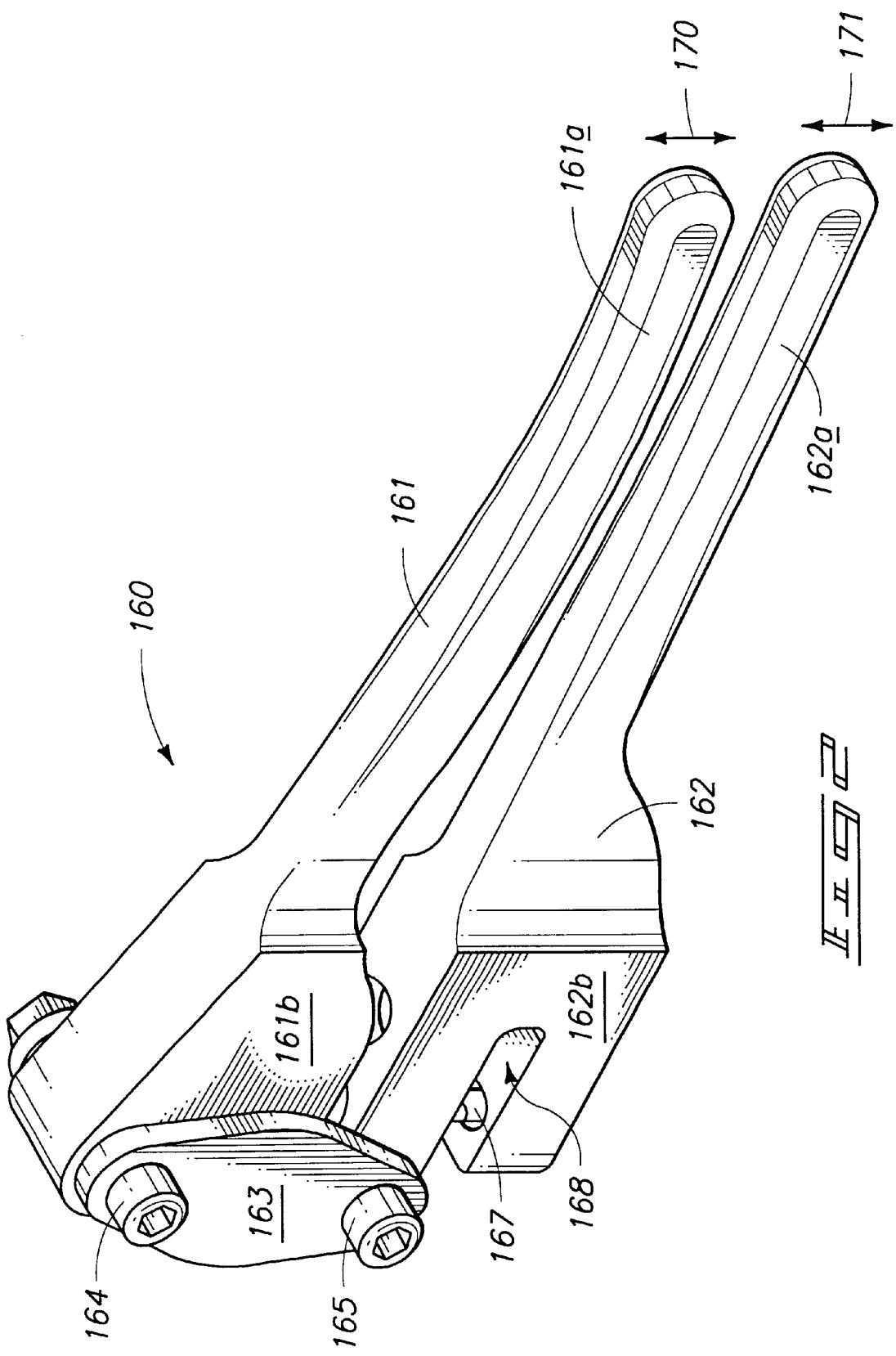

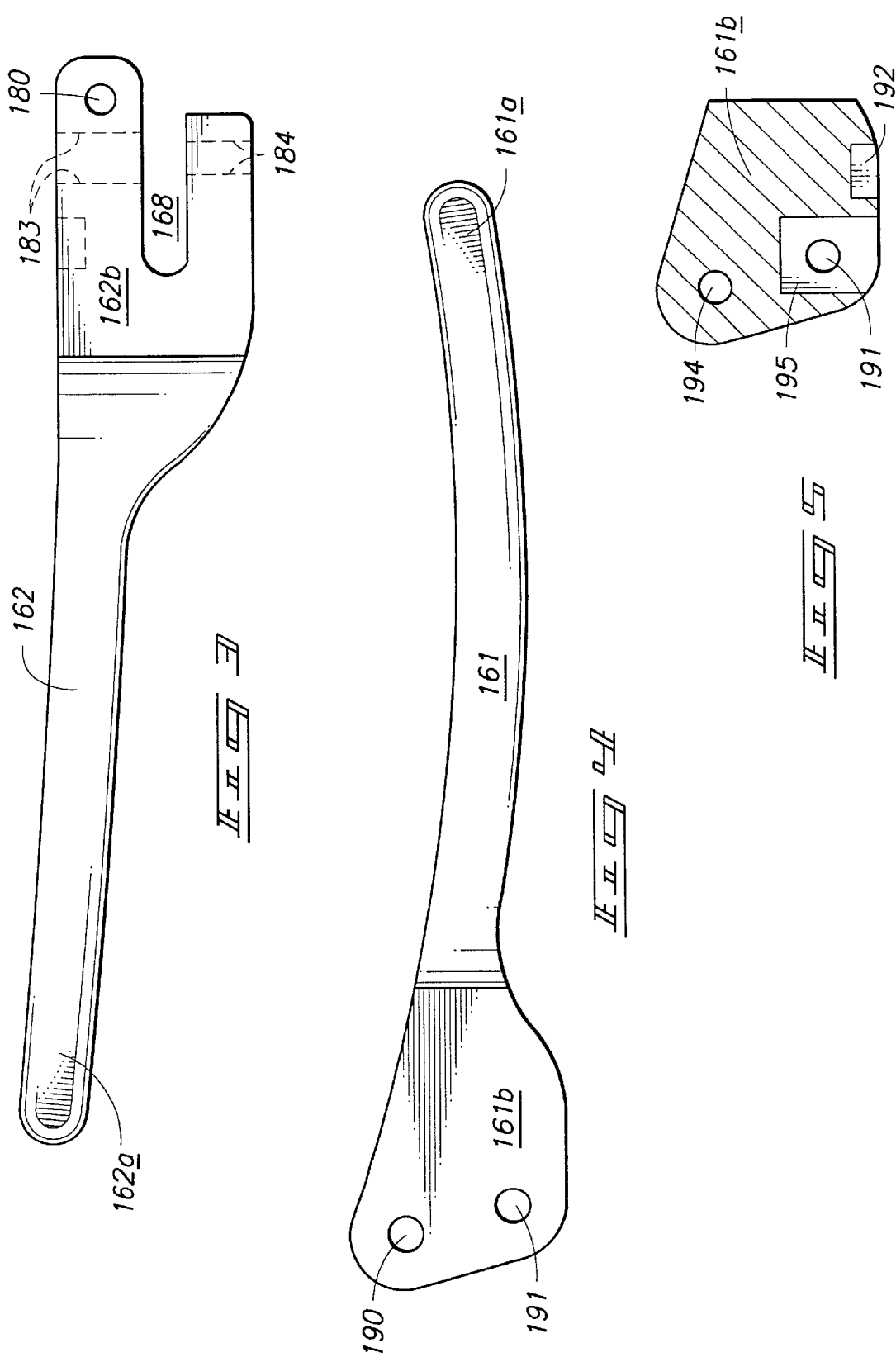

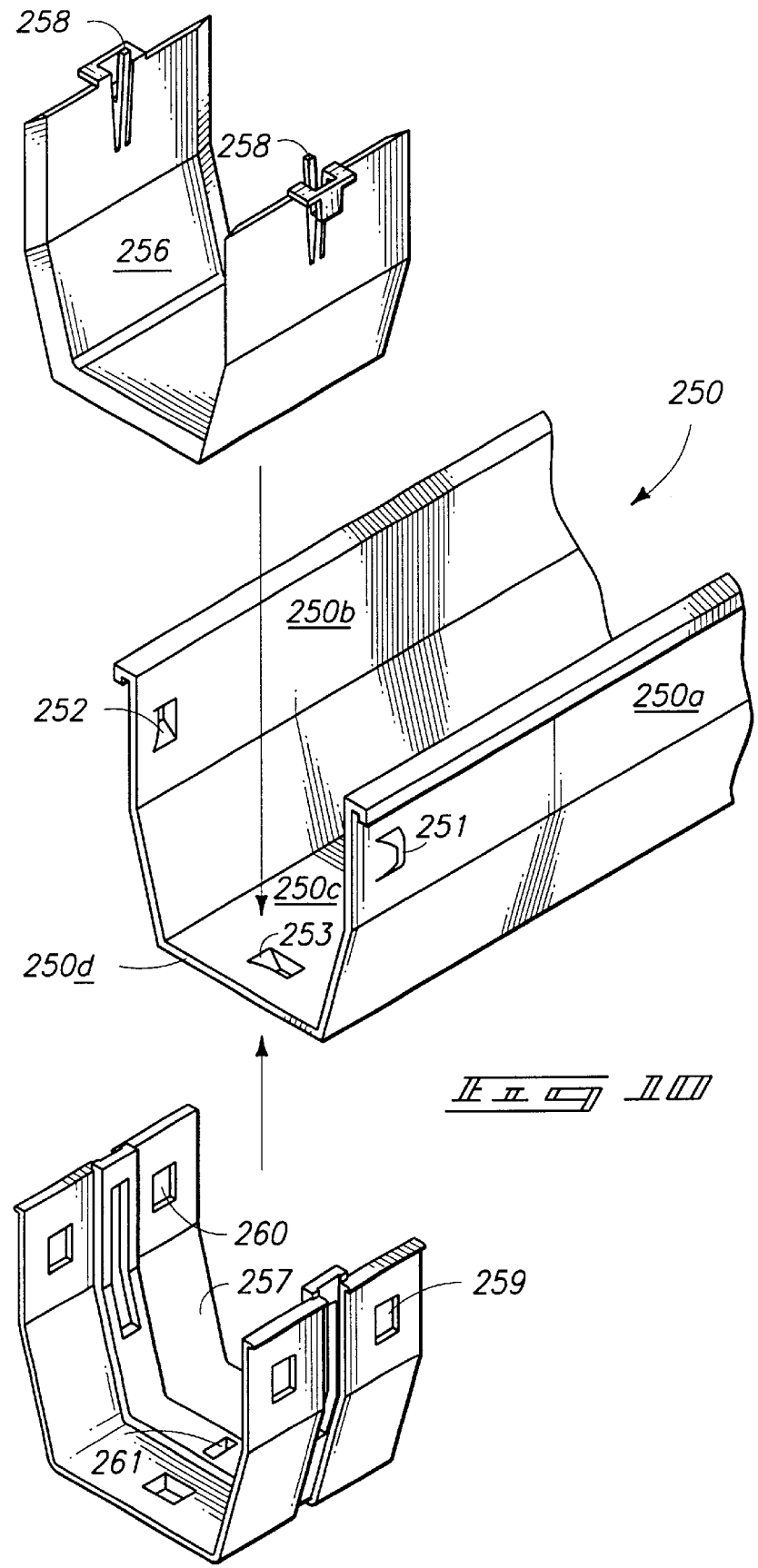

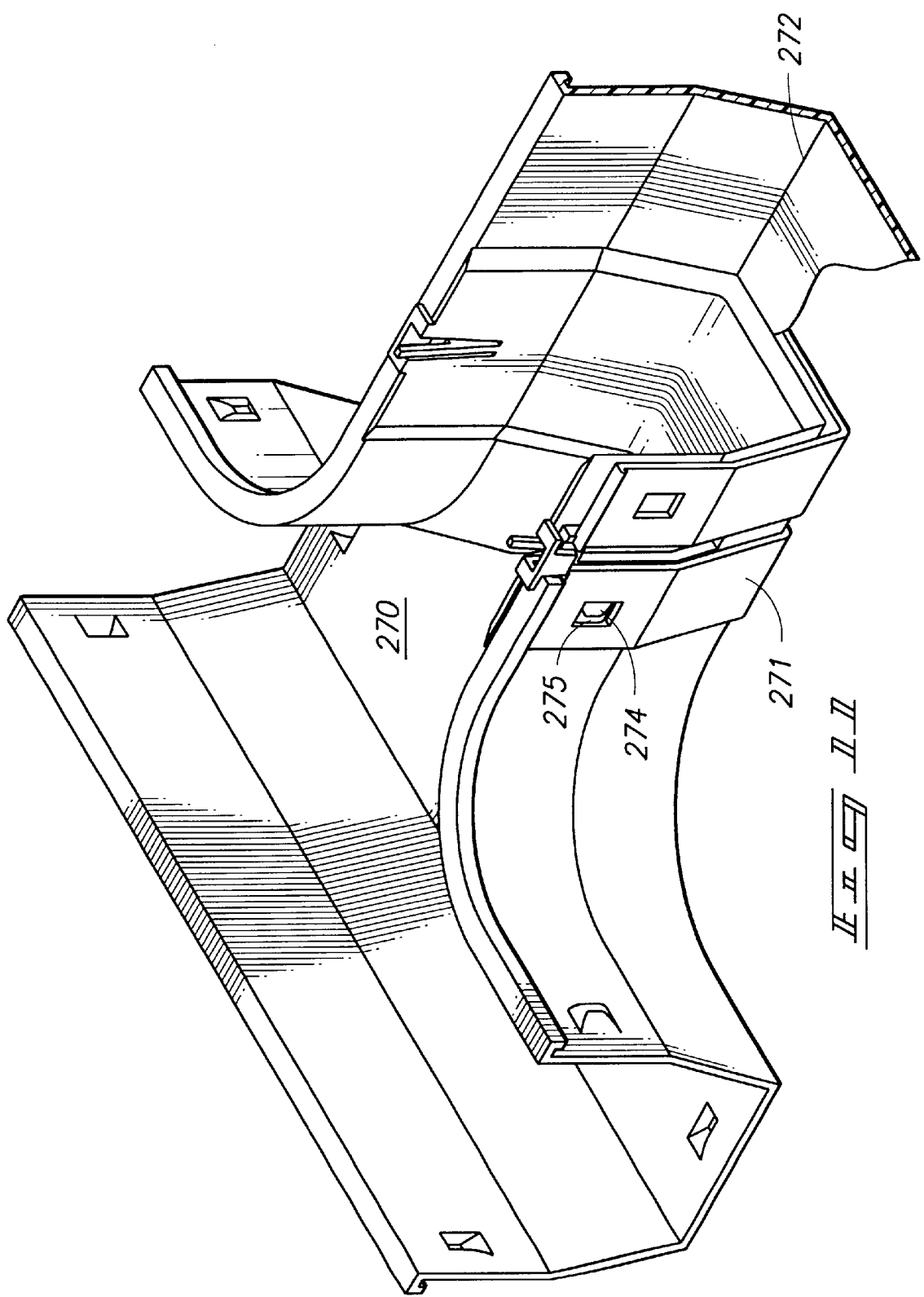

FIBER OPTIC CABLE TROUGH COMPONENT NOTCHING SYSTEM

TECHNICAL FIELD

This invention pertains to a system for imparting notches into fiber optic cable trough components to facilitate their connection or attachment.

BACKGROUND OF THE INVENTION

In the telecommunications industry there are numerous locations where a significant amount of fiber optic cable must be routed within a facility or from one facility to another. The routing within a facility may be from one piece of equipment to another or even from outside lines coming into a central office and to connectors where the lines are connected to equipment within the facility.

There are typically a large number of fibers and all the fibers must all be handled with care to avoid damage to the fiber optic cable, which would hinder its performance.

In a typical facility, fiber optic troughs are normally used to carry or route the fiber optic cables. In many facilities, the troughs or raceways are located overhead and over the locations of the fiber optic distribution frames, bays and equipment.

A significant trough network or raceway configuration may be needed to contain and route the fiber optic cables. The installation time and expense can be substantial for trough systems and is further increased in situations in which the troughs are not readily adaptable to the configuration desired in the facility, or when the troughs, couplings, junctions, downfalls and other equipment do not readily install or easily assemble.

In some prior art systems, numerous screws and other attachment hardware are typically utilized to attach the various trough components to one another.

There is a need for improved ways to construct and assemble such trough or raceway systems, which is one of the objects of this invention.

BRIEF DESCRIPTION OF THE DRAWINGS

Preferred embodiments of the invention are described below with reference to the following accompanying drawings.

FIG. 1 is an elevation view of an embodiment of a notching tool as contemplated by this invention;

FIG. 2 is a perspective view of the embodiment of this invention shown in FIG. 1;

FIG. 3 is an elevation view of a second lever which may be used in the embodiment of the invention illustrated in FIG. 1;

FIG. 4 is an elevation view of a first lever which may be used in the embodiment of the invention illustrated in FIG. 1;

FIG. 5 is a cross-section view of the jaw end of the first lever illustrated in FIG. 4;

FIG. 10 is a perspective exploded view of embodiments of this invention as they may be utilized in coupling a longitudinal trough to a trough coupling;

DETAILED DESCRIPTION OF THE PREFERRED EMBODIMENTS

Figure 11:
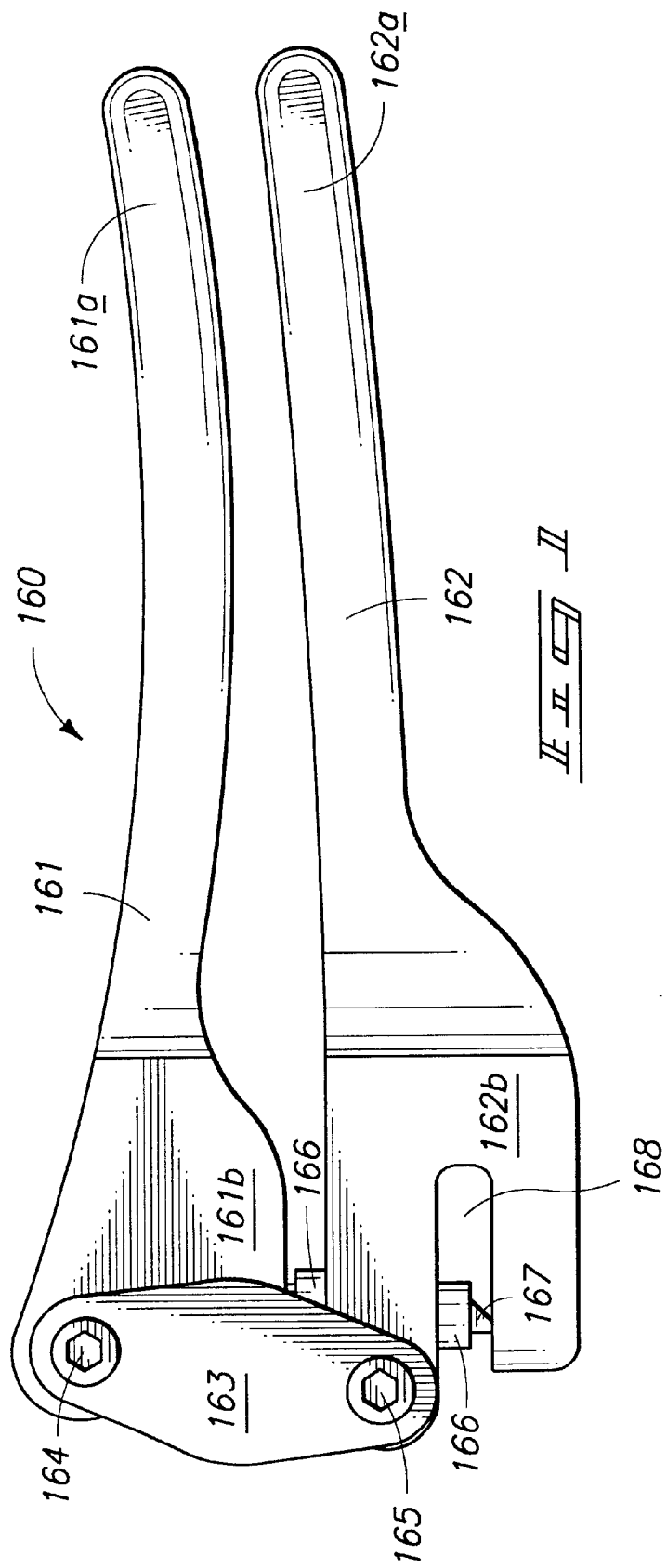
FIG. 11 is a perspective view of a trough junction coupled to a longitudinal trough section utilizing embodiments of this invention.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "trough components" as used herein is meant to include any one of a number of different trough components which may be joined together through the use of a notch or projection as disclosed herein, including without limitation straight longitudinal fiber optic cable troughs, transition troughs, down-spouts, down troughs, junction troughs, coupling troughs, T-troughs, elbow troughs and others.

The "system", including the notching tool and the methods disclosed herein, is directed to the creation of detents and projections in fiber optic cable trough components. It may be preferable in one case to create a projection on the second side of a wall being notched for use in connecting to trough components. It may also be preferable in another use of an embodiment of the invention to create a detent for use in combination with a notch on a different trough component.

The creation of plastic deformation in a fiber optic trough component can be used either way and this invention contemplates situations whether the detent side is utilized, the projection side is utilized, or both. In the claims section, therefore, if the term "projection" is used, that is also intended to cover situations where projection is created with a corresponding detent and either one or both of the two is utilized in combining two trough components. A detent for instance could be used in combination with a corresponding resilient member, tab or latch from a corresponding or complimentary trough component. A projection on the other hand may be used to cause sufficient friction so that one component is snugly placed or fit into the guide walls of a trough. Alternatively, a projection may be utilized more as a stop after it is slid into a corresponding aperture or cavity on a complimentary trough component to keep the two trough components from pulling apart.

FIG. 1 is an elevation view of one embodiment of a notching tool 160 which may be utilized in this invention, illustrating first lever 161 with handle side 161a and jaw side 161b, second lever 162 with handle side 162a and jaw side 162b. Wall aperture 168 receives a wall of a trough component and when ram 166 is lowered into wall aperture 168, the punch 167 of ram 166 imparts the detent and corresponding projection into the wall of the trough component.

First lever 161 is pivotally attached to side plate 163 at pivot 164. Second lever 162 is pivotally attached to side plate 163 at pivot point 165. There are preferably two side plates 163, one on each side of the first lever 161.

As can be seen in FIG. 1, ram 166 projects outwardly from first lever 161, through a guide aperture in second lever 162, to allow ram 166 to be forced into a trough component wall located in wall aperture 168.

FIG. 2 is a rear perspective view of notching tool 160 and includes like numbers from FIG. 1, all of which are the same as described with respect to FIG. 1. Shown in FIG. 2 are first lever 161 with handle side 161a and jaw side 161b, and second lever 162 with handle side 162a and jaw side 162b. Arrow 170 indicates the movement of handle side 161a of first lever 161 and arrow 171 illustrates movement of handle side 162a of second lever 162.

FIG. 2 also illustrates wall aperture 168, punch 167, pivot point 165 where second lever 162 is pivotally attached to side plate 163, and pivot point 164, the location at which first lever 161 is pivotally attached to side plate 163.

FIG. 3 is an elevation view of second lever 162 showing handle side 162a and jaw side 162b. Pivot point aperture 180 in second lever 162 is utilized for providing a pivotal attachment to side plate 163 (shown in FIG. 2). Ram guide aperture 183 provides an aperture through which ram 166 (shown in FIG. 1) may be slid and guided to impart force through ram tool punch 167 (shown in FIG. 1) on a wall within wall aperture 168. Ram tool aperture 184 provides clearance during the creation of a projection in the wall of a trough component.

FIG. 4 is an elevation view of first lever 161 with handle side 161a and jaw side 161b. Pivot point aperture 190 is utilized for the pivotal connection of first lever 161 to side plate 163 (shown in FIG. 2). Aperture 191 in first lever 161 is utilized to retain the ram in first lever 161.

FIG. 5 more fully illustrates how a ram may be inserted into ram aperture 195, the ram containing a hole corresponding to aperture 191 so that an axial component, a bolt or other member may be inserted through aperture 191 and first lever 161 and through a corresponding aperture in the ram to retain the ram within first lever 161. FIG. 5 is a cross-section of the jaw end 161b of first lever 161, which further shows alignment aperture 192.

Figure 6:
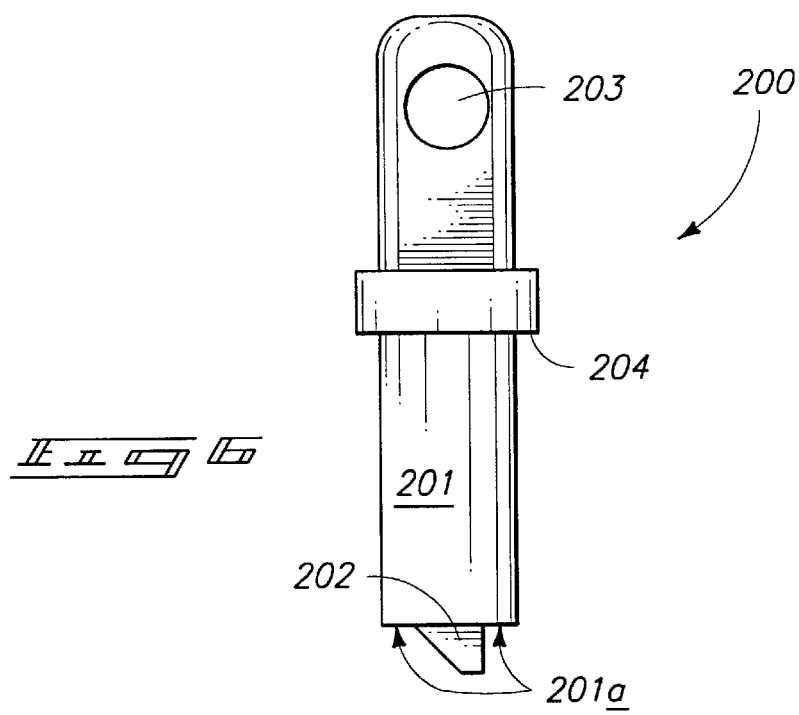
FIG. 6 is an elevation view of a ram which may be used in the notching tool illustrated in FIG. 1.

FIG. 6 is an elevation view of one embodiment of a ram 200 which may be utilized in combination with, and part of, the embodiment of a notching tool illustrated in prior figures. FIG. 6 illustrates ram 200 with shoulder 204, lower section 201 which generally corresponds in size and shape to the ram guide aperture 183 as shown in FIG. 3 to allow relative movement thereof. Ram tool 202 is the leading, front or forward end of the ram 200 which imparts the force on a sidewall of a trough component and creates the detent and corresponding projection therein by deformation or other means. Aperture 203 in ram 200 corresponds to aperture 191 in first lever 161, as shown more fully in FIGS. 4 and 5, and through which a bolt or other member may be placed to secure ram 200 within first lever 161. Shoulder 201a of the lower portion of ram 200 provides a stop surface to control the depth at which ram 202 is forced through a sidewall of a trough component being notched.

Figure 7:
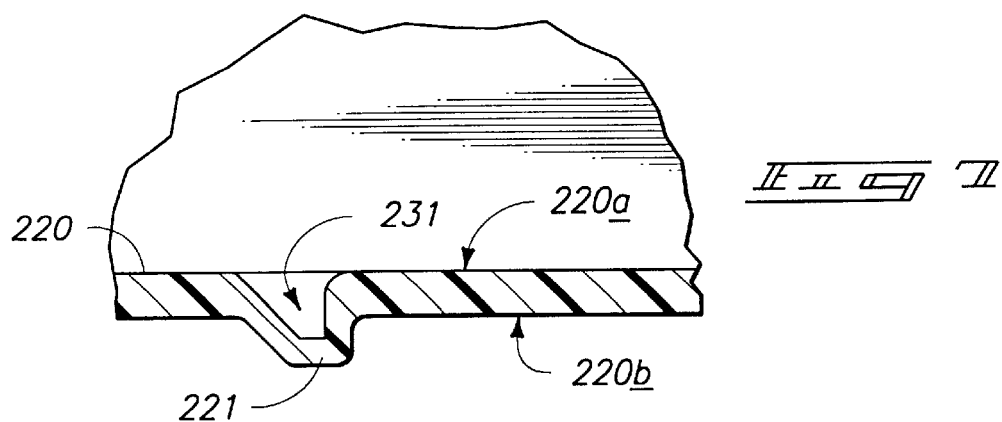
FIG. 7 is a perspective view of one shape and one embodiment of a projection which may be utilized in this invention.

FIG. 7 is a cross-sectional view of one example of a projection which may be created as part of this invention, showing first side 220a and second side 220b of a wall 220, which is representative of any one wall of a number of potential trough components. Projection 221 projects from second surface 220b with a corresponding detent 231 in first side 220a of wall 220.

Figure 8:
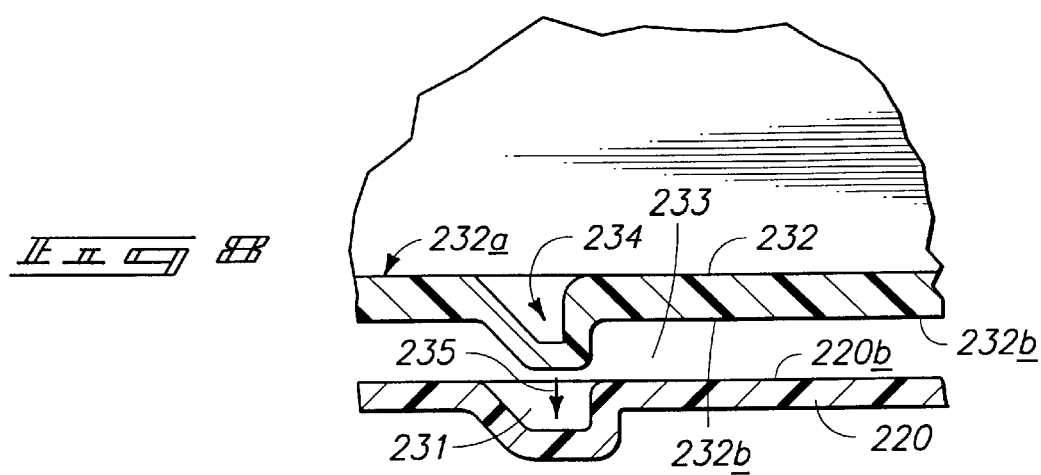
FIG. 8 is a cross-section view of one embodiment of a projection and detent which may be utilized as part of this invention.

FIG. 8 shows the same wall as in FIG. 7 (the lower wall), with like numbers being utilized for like components, features and aspects. FIG. 8 further shows a cross-sectional view of an example of one potential application or embodiment with a second wall 232. Second wall 232 includes projection 233 combined with a detent 231.

FIG. 8 shows first side 232a and second side 232b of second wall 232 with detent 234 and projection 233 being created utilizing a notching tool as disclosed herein. Arrow 235 shows how projection 233 may be inserted within detent 231 to prevent side to side movement of the first wall 220 relative to the second wall 232. The detent 231 may also correspond to and interact with a flexible or resilient member such as a projection or tab, which could also be represented by item 232a, in a similar way to its shown interaction with second wall 232.

Figure 9:
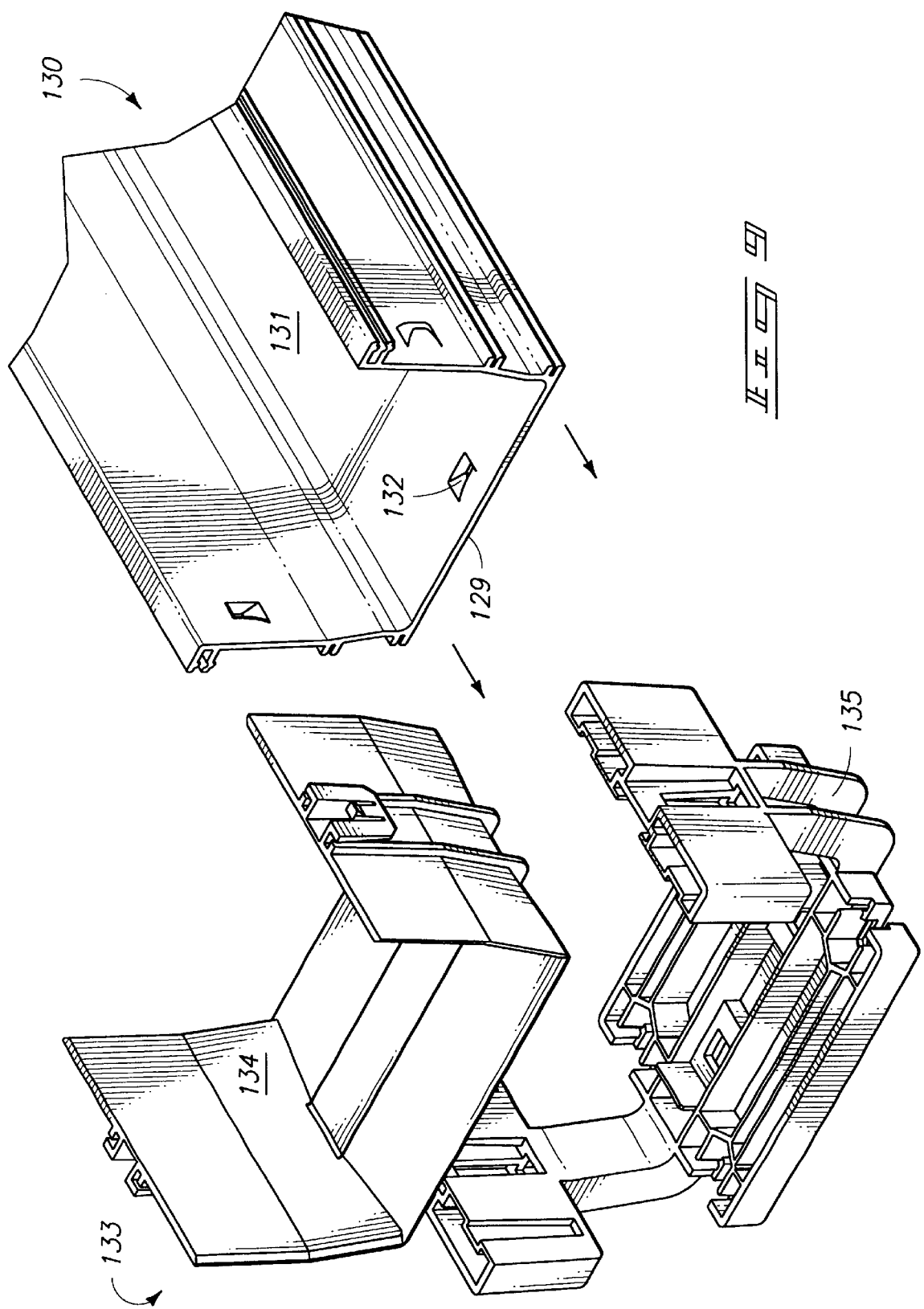
FIG. 9 is a perspective view of an application of an embodiment of this invention, illustrating the use of a notch or projection in assembling two trough components.

FIG. 9 illustrates a longitudinal fiber optic cable trough 130 and a trough coupling system 133 which would include a first coupling piece 134 and a second coupling piece 135 which when connected together create a wall guide into which the terminal end 129 of trough 130 may be slid.

Projection 132 is shown imparted on the bottom surface 131 of trough component 130. As trough component 130 is slid into a wall guide in a trough coupling system 133, projection 132 may provide additional friction and a barb-like effect on a corresponding wall in the wall guide. The projection thereby provides holding support to prevent trough component 130 from sliding back out of the wall guide.

Conversely, it will be appreciated by those of ordinary skill in the art that a corresponding or complimentary resilient member or notch may be provided in coupling 133, a trough component, to insert into the corresponding detent which would be on the lower side of projection 132 and would contemporaneously be created by the notching tool when the projection 132 is created. It will also be appreciated that no particular number, shape or configuration of either the projection 132 or corresponding detent is required to practice this invention, but instead any shape may be utilized, including without limitation, barb shapes, triangular, square, curved, star shaped, mound shaped, and others.

FIG. 10 shows another application of an embodiment of a system contemplated by this invention, used in combination with fiber optic cable troughs. FIG. 10 illustrates longitudinal trough section 250 with first projection 251 on side trough sidewall 250a, second projection 252 on second sidewall 250b, and third projection 253 on bottom surface 250c. From the inner cavity or portion of the trough 250, the projections are actually detents. The application shown in FIG. 10 is a trough coupling system and the coupling is a trough component which snaps together around the terminal end 250d of longitudinal trough 250.

Inner coupling portion 256 fits within trough 250 and secures to outer coupling 257 via latches 258. Longitudinal trough 250 would, in this example, snap fit into outer coupling section 257 with first projection 251 snapping into first aperture 259. Second projection 252 would snap into aperture 260 and third projection 253 would snap into aperture 261 on the outer coupling section 257. The walls are appropriately resilient to allow the components to snap together.

FIG. 11 shows yet another one of the many applications of this system, showing a junction or T trough 270 (another trough component) connected by coupling 271 to longitudinal trough section 272. The assembly configuration utilized in FIG. 11 is the same as that utilized in FIG. 10 with, for example, projection 274 being located within aperture 275 as one attachment or holding mechanism.

Figure 12:
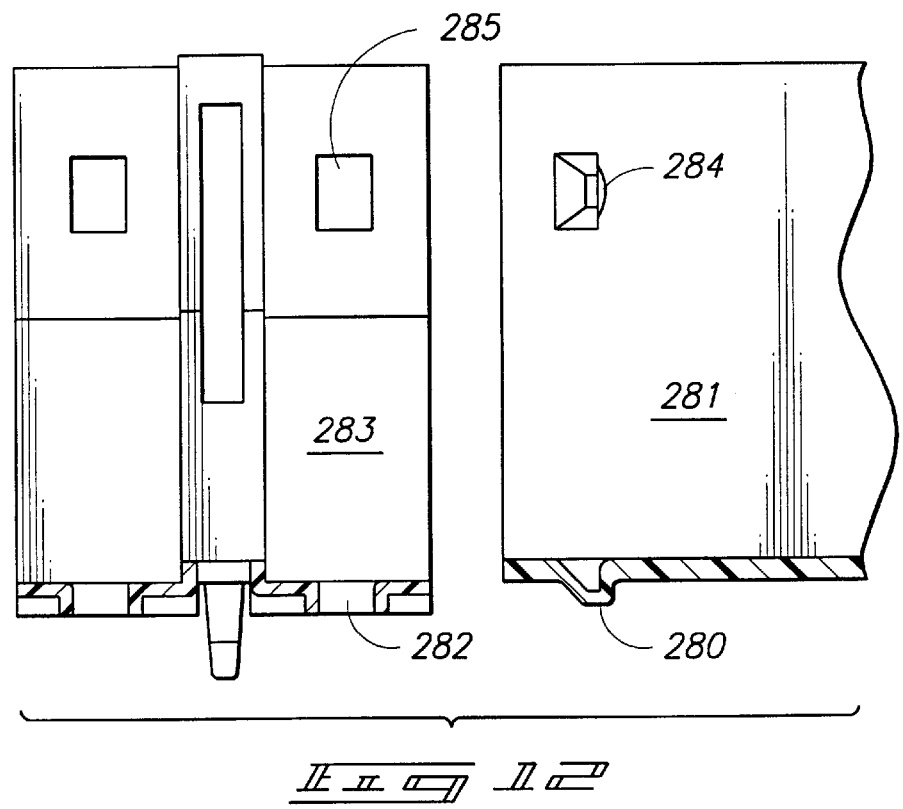
FIG. 12 is an elevation exploded section view of a longitudinal trough and a trough coupling which are to be coupled together using embodiments of this invention.

FIG. 12 illustrates how projection 280 in longitudinal trough section 281 would slide fit into aperture 282 of trough coupling 283. Further, projection 284 corresponds to and fits within aperture 285 when longitudinal trough 281 is slid into trough coupling 283.

Figure 13:
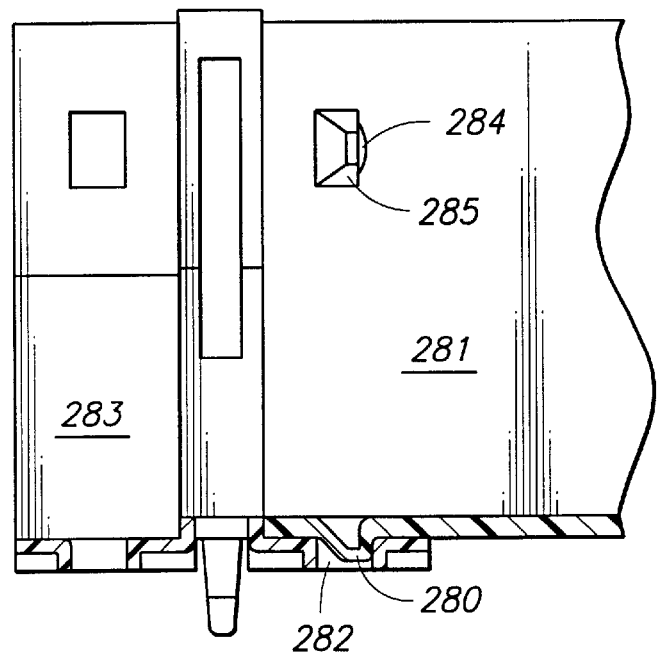
FIG. 13 is an elevation view of the components illustrated in FIG. 12, after the coupling has been secured to the longitudinal trough.

FIG. 13 illustrates the longitudinal trough 281 slid into coupling 283. FIG. 13 illustrates projection 280, aperture 282, and projection 284 within aperture 285. The configuration in FIG. 13 would result in the longitudinal trough 281 being secured within trough coupling 283 without the need for screws and other hardware.

Figure 14:
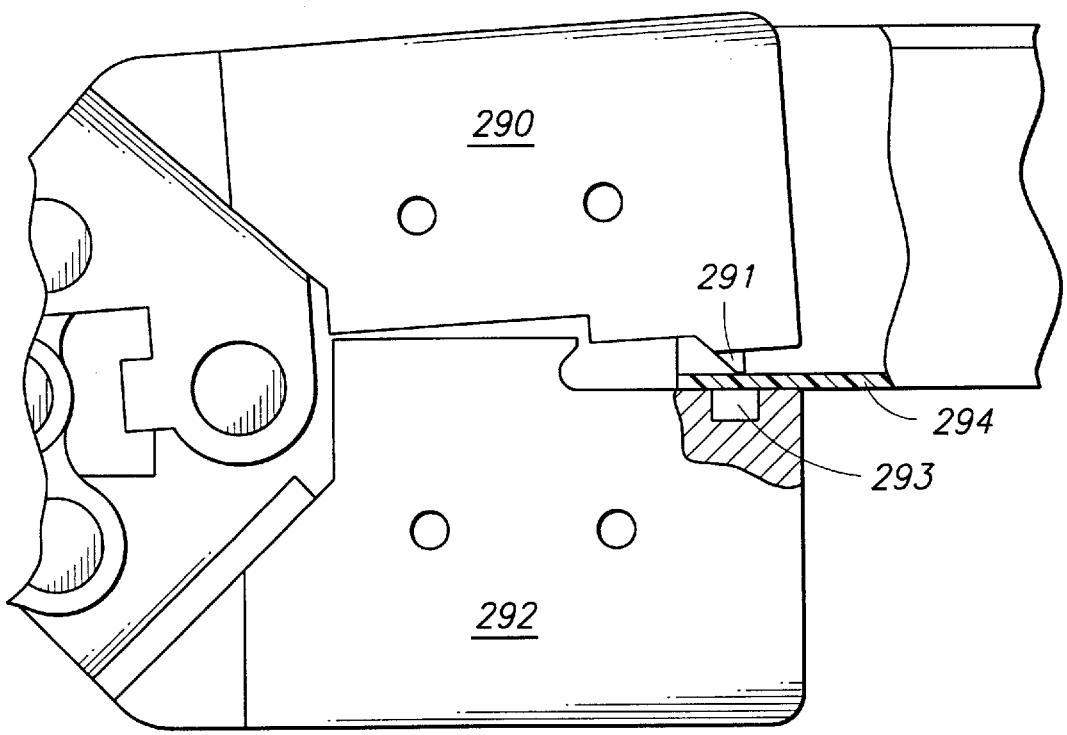
FIG. 14 is an elevation view of a notching tool with a wall section of a trough component between the jaws before the projection is created.

FIG. 14 illustrates another one of the numerous different configurations for a jaw end of a notching tool contemplated by this invention, illustrating first jaw 290 with ram tool 291, second jaw 292 with ram aperture 293 therein. Wall section 294 of a trough component is shown between ram tool 291 and ram aperture 293 just before a projection is created in wall section 294.

Figure 15:
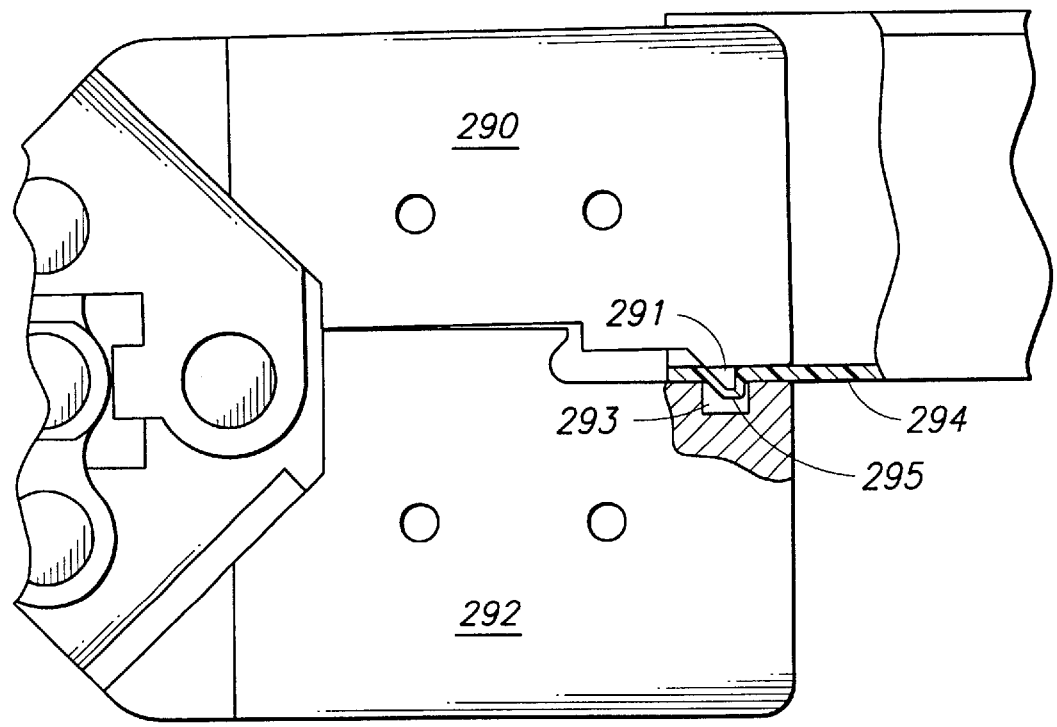
FIG. 15 is an elevation view of the jaw section of a notching tool after the projection has been created in the wall section of the trough component.

Once first jaw 290 and second jaw 292 are forced together, a projection 295 (as shown in FIG. 15) is created on the lower side of wall section 294 and a detent created in the upper portion of 294 by ram tool 291 forcing a portion of wall section 294 into ram aperture 293.

FIG. 15 shows the jaw configuration illustrated in FIG. 14 after force has been applied and the projection 295 and corresponding or complementary detent have been created in the wall section 294. Like items in FIG. 15 are numbered as in FIG. 14.

Figure 16:
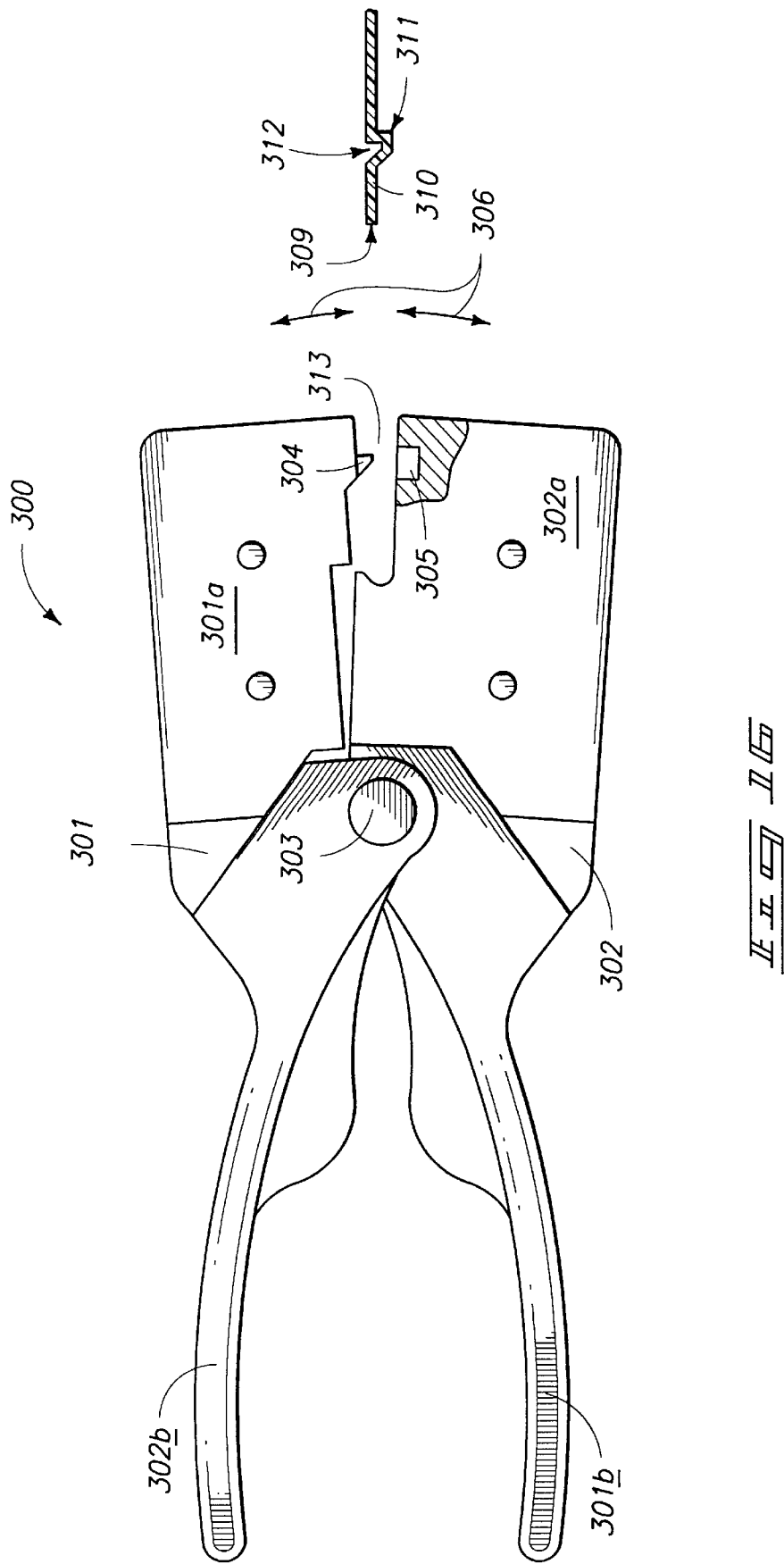
FIG. 16 is an elevation view of another embodiment of a notching tool contemplated by this invention.

FIG. 16 is an elevation view of one embodiment of a single pivot notching tool 300 contemplated by this invention, illustrating first lever 301 with jaw side 301a and handle side 301b, second lever 302 with jaw side 302a and handle side 302b. The two levers are pivotally connected via pivot point 303. Wall aperture 313 receives wall 310 of a trough component, wall 310 having terminal end 309. First wall 310 illustrates a detent 312 and a projection 311 which may be imparted by notching tool 300.

Jaw side 301a of first lever 301 moves with respect to jaw side 302a of second lever 302 to increase and decrease wall aperture 313 and to force ram 304 into a first wall 310, thereby creating the detent 312 and the projection 311. Ram aperture 305 in second lever 302 provides space for the projection 311 and detent 312 in first wall 310.

It will be appreciated there are numerous different embodiments for such a notching tool for the imposition of a corresponding detent and projection in a trough component. Preferably the trough component will be made of plastic, but this invention is not limited to application on any particular type of material, but instead it may be applied to aluminum, alloys, and other metals, as well as any other suitable wall material, all as contemplated within the scope of this invention.

It should also be noted that system embodiments of this invention cover more automated ways of creating the notches, detents and/or projections, a few examples of which may be a pneumatic press with a punch thereon, or an electrically powered press to impart the force on the trough component wall.

It should also be noted that embodiments of this invention are not limited to any particular configuration of notching tool, but instead contemplates notching tools with either one or two levers, a lever and a base, or with an automated source of force to drive the punch into the wall of the trough component.

Figure 17:
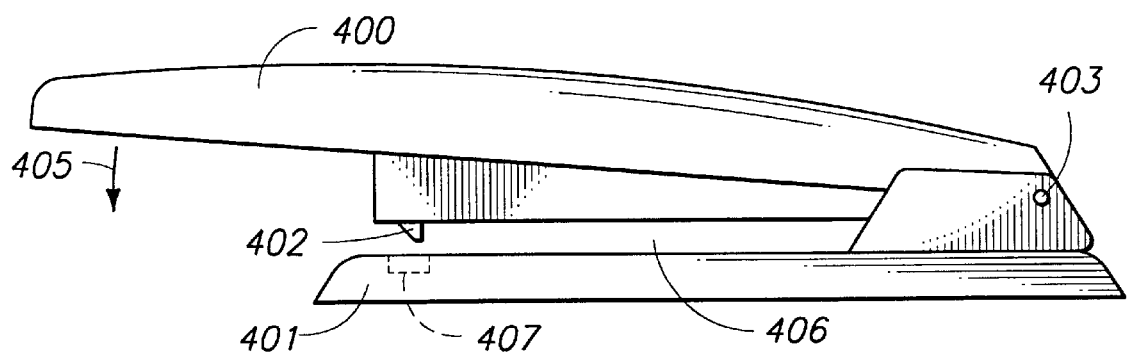
FIG. 17 is a side view of another embodiment of a notching tool contemplated by this invention, with a single lever arm.

FIG. 17 is a side view of another embodiment of a notching tool contemplated by this invention, with a single lever arm 400 pivotally attached to base 401 at pivot point 403. When lever arm 400 is moved in the direction of arrow 405, punch 402 will be forced into a wall of a trough component in opening 406, thereby forcing the punch 402 into punch aperture 407 in base 401. This will create a projection and corresponding detent. Although not limited to it, this embodiment may preferably be used when the base 401 is on a support surface, floor or other solid work surface.

Figure 18:
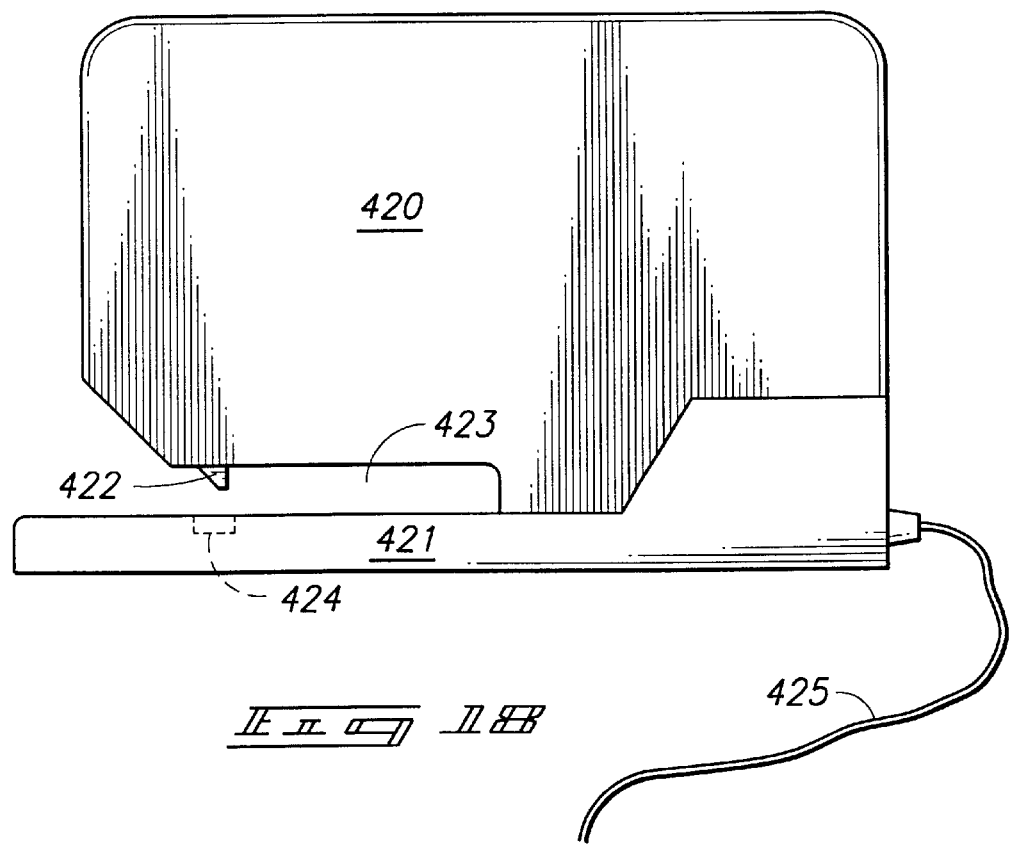
FIG. 18 is a side view of an automated embodiment of a notching tool contemplated by this invention.

FIG. 18 is a side view of an automated embodiment of a notching tool contemplated by this invention, illustrating base 421, housing 420, punch 422, and wall aperture or opening 423, which receives a torugh component wall. The automated tool then includes in housing 420 or elsewhere the force to force punch 422 into the wall of the trough component. The source of the force housed in housing 420 may be any one of a number of known ways, such as with electricity, hydraulics, pneumatics, or others, all within the contemplation of this invention. Item 425 may be a source of electricity or pneumatic fluid, depending on the embodiment or application.

This invention further contemplates additional features to further the creation and attributes of the detents and/or projections created in the walls of fiber optic cable trough components. For instance, the trough component wall may be heated, or heat may be provided to, in or through the punch to facilitate the creation or configuration of the detent and/or projection. This may be by electrical resistance heating or any one of a number of other known sources of heat.

As will be appreciated by those of reasonable skill in the art, there are numerous embodiments to this invention, and variations of elements and components which may be used, all within the scope of this invention.

One embodiment of this invention for example is a fiber optic cable trough notching tool, comprising: a base with a base surface and a punch aperture; a pivotally movable first lever with a punch operatively attached to the first lever, the punch disposed to be forced into a trough component wall placed in a wall opening between the punch and the punch aperture; wherein the punch forces a portion of the trough component wall into the punch aperture when the first lever is pivoted toward the base. This embodiment may be configured such that the punch is shaped to impose: a barb shaped projection on a side of the trough component wall away from the punch; and/or a barb shaped detent on a side of the trough component wall adjacent the punch. It will also be appreciated by those of ordinary skill in the art that embodiments of this invention are applicable to trough component walls no matter what they are made or comprised of, such as for example, plastic, aluminum or steel.

Additional embodiments of the foregoing include embodiments wherein: the punch is one piece with the second lever; and/or when heat is provided to the trough component wall to assist in the deformation or forming thereof.

Another embodiment of this invention is a fiber optic cable trough notching tool, comprising: a first lever with a handle side, a jaw side, and a punch aperture on the jaw side; a second lever with a handle side and a jaw side, the second lever being pivotal with respect to the first lever; the second lever including a punch which projects toward the punch aperture on the first lever, the punch being configured and sized to move at least partially through the punch aperture when the second lever is pivoted relative to the second lever; and a receiving area between the punch and the punch aperture configured to receive a fiber optic cable trough component wall. An additional embodiment to the foregoing is when the tool further comprises two side plates to which the first lever is attached (pivotally or fixedly), and to which the second lever is pivotally attached spaced apart from the first lever. This embodiment may be configured such that the punch is shaped to impose: a barb shaped projection on a side of the trough component wall away from the punch; and/or a barb shaped detent on a side of the trough component wall adjacent the punch. It will also be appreciated by those of ordinary skill in the art that embodiments of this invention are applicable to trough component walls no matter what they are made or comprised of, such as for example, plastic, aluminum or steel.

Additional embodiments of the foregoing include embodiments wherein: the punch is one piece with the second lever; and/or when heat is provided to the trough component wall to assist in the deformation or forming thereof.

In another embodiment of the invention, a fiber optic cable trough notching device is provided, which comprises: a base with a base surface and a punch aperture; a punch spaced apart from the punch aperture by a wall opening disposed to receive a trough component wall, the punch being disposed to be forced into the trough component wall; and whereby the wall is forced into the punch aperture by the force imposed on the punch. In this embodiment, the force imposed on the punch may be from any one of a number of different sources, such as a pneumatic or hydraulic force. This embodiment may be configured such that the punch is shaped to impose: a barb shaped projection on a side of the trough component wall away from the punch; and/or a barb shaped detent on a side of the trough component wall adjacent the punch. It will also be appreciated by those of ordinary skill in the art that embodiments of this invention are applicable to trough component walls no matter what they are made or comprised of, such as for example, plastic, aluminum or steel.

Additional embodiments of the foregoing include embodiments wherein: the punch is one piece with the second lever; and/or when heat is provided to the trough component wall to assist in the deformation or forming thereof.

In another embodiment of this invention, a means for imparting a projection in a fiber optic cable trough component wall is provided, which comprises: a means of supporting the trough component wall which includes a punch aperture; a punch means; an opening between the punch means and the means of supporting the trough component wall, the opening being disposed to receive a trough component wall; a force imposition means for applying a force on the tool means to force the tool means into the trough component wall present in the trough component wall opening and into the punch aperture; pivotally movable first lever with a punch operatively attached to the first lever, the punch disposed to be forced into a trough component wall placed in a wall opening between the punch and the punch aperture; wherein the punch forces a portion of the trough component wall into the punch aperture when the first lever is pivoted toward the base.

In another embodiment, a process embodiment, a method for imparting a projection on a fiber optic cable trough component wall is provided which comprises the following steps: providing a base with a base surface and a punch aperture; providing a punch spaced apart from the punch aperture by a wall opening disposed to receive a trough component wall, the punch being disposed to be forced into the trough component wall; and placing a trough component wall in the wall opening; forcing the punch into the trough component wall and into the punch aperture; wherein a projection is created on the trough component wall. The wall may be comprised of any type of material, including without limitation, plastic or metal, and additional methods such as imparting heat on the trough component wall may also be utilized.

In another process embodiment, a method for operatively connecting two fiber optic cable trough components is disclosed and is comprised of the following steps: providing a first trough component with a first wall which includes a first side and a second side; providing a second trough component configured to operatively attach to the first trough component, the second trough component having a first notch cavity; imparting a force on the first side of the first wall of the first trough component, thereby deforming a portion of the first wall and creating a first projection on the second side of the first trough component; and moving the second trough component relative to the first trough component such that the first projection is lodged in the first notch cavity of the second trough component.

In yet another process embodiment contemplated by this invention, a method for coupling two fiber optic cable trough components is provided and is comprised of the following steps: providing a first trough component having a first wall which includes a first side and a second side; providing a second trough component with a wall guide having first and second guiding surfaces spaced apart and configured to slidably receive the terminal end of the first wall between the first and second guiding surfaces; imparting a force on the first side of the first wall, thereby deforming a portion of the first wall and creating a first projection on the second side of the first wall; and sliding the first wall into the wall guide such that the first projection snugly fits within the wall guide and at least partially holds the first wall within the wall guide.

In still yet another process embodiment of the invention, a method for operatively connecting two fiber optic cable trough components is provided, and is comprised of the following steps: providing a first trough component with a first wall which includes a first side and a second side, providing a second trough component configured to operatively attach to the first trough component, the second trough component having one of a projection and a resilient tab; imparting a force on the first side of the first wall of the first trough component, thereby deforming a portion of the first wall and creating a first detent on the first side of the first trough component; and moving the second trough component relative to the first trough component such that the one of a projection and a resilient tab is lodged in the first detent of the first trough component.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fiber optic cable trough notching tool, comprising:

a first lever pivotally mounted at a pivot point to two side plates, the first level having a handle side, a jaw side, and a punch aperture on the jaw side between the pivot point and the handle side;

a second lever pivotally mounted at a pinot point to the two side plates, the second lever having a handle side and a jaw;

the second lever including a punch which project toward the punch aperture on the first lever, the punch being configured and sized to move at least partially through the punch aperture when the second lever is pivoted relative to the second lever and the punch aperture being between the pivot point and the handle side of the second lever, wherein the punch is shaped to impose a barb shaped projection on a side of the through component wall away from the punch and a barb shaped detent on a side of the trough component wall adjacent the punch; and a receiving area opposed to the punch and the punch aperture configured to receive a fiber optic cable trough component wall.

2. A fiber optic cable trough notching tool as recited in claim 1, and wherein the trough component wall is comprised of one plastic, aluminum or steel.

3. A fiber optic cable trough notching tool as recited in claim 1, and wherein heat is provided to the trough component wall.

* * * * *

UNITED STATES PATENT AND TRADEMARK OFFICE
CERTIFICATE OF CORRECTION

PATENT NO. : 6,711,930 B2
DATED : March 30, 2004
INVENTOR(S) : Thom et al.

It is certified that error appears in the above-identified patent and that said Letters Patent is hereby corrected as shown below:

Column 10,
Line 3, replace "a second lever pivotally mounted at a pinot point to the" with
-- a second lever pivotally mounted at a pivot point to the --

Signed and Sealed this

Twenty-sixth Day of July, 2005

JON W. DUDAS
*Director of the United States Patent and Trademark Office*